Figure 1:
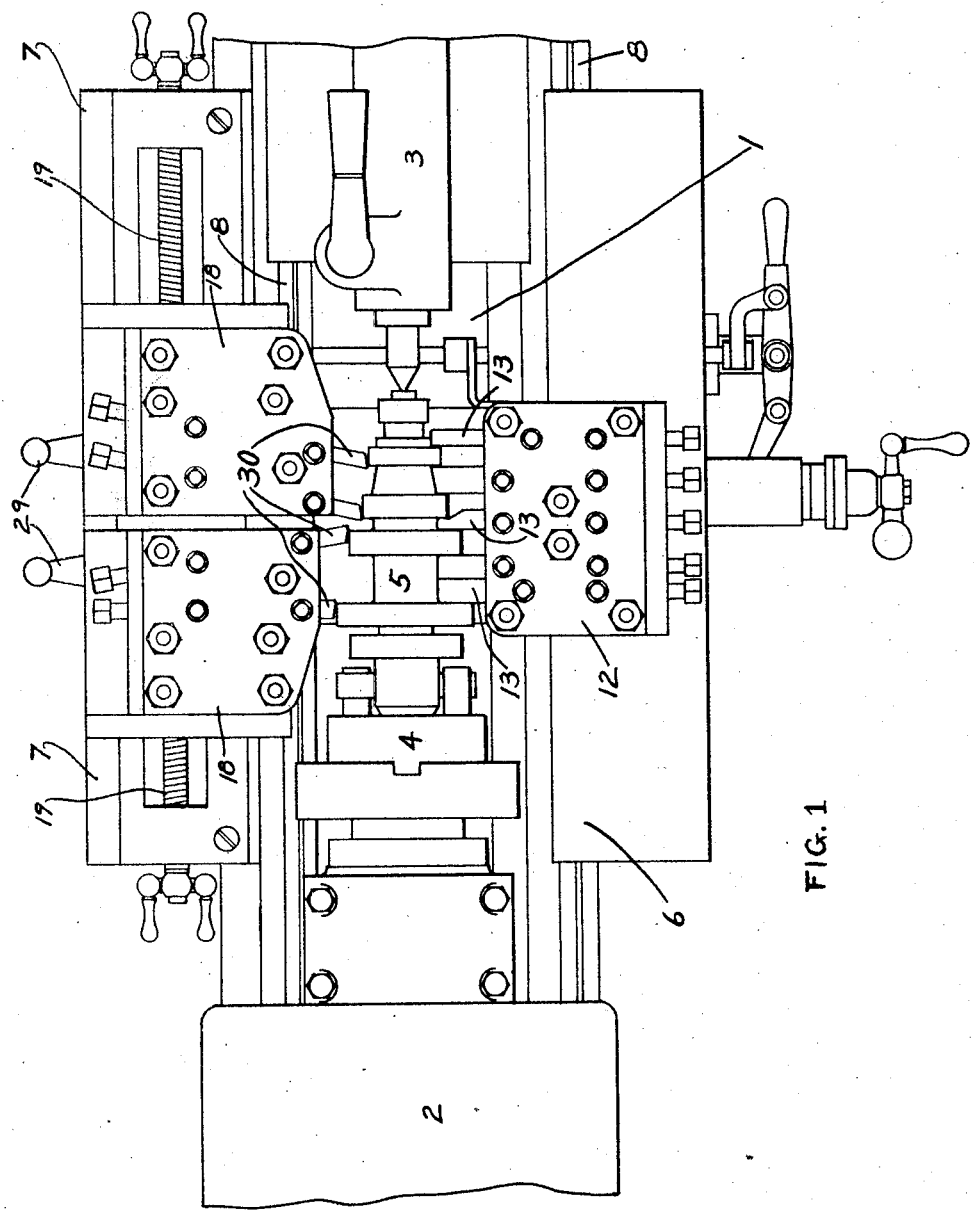

July 19, 1927.

W. E. WHIPP

LATHE

Filed Jan. 21, 1926

1,636,028

3 Sheets-Sheet 1

INVENTOR,
Wendell E. Whipp,
BY
HIS ATTORNEY

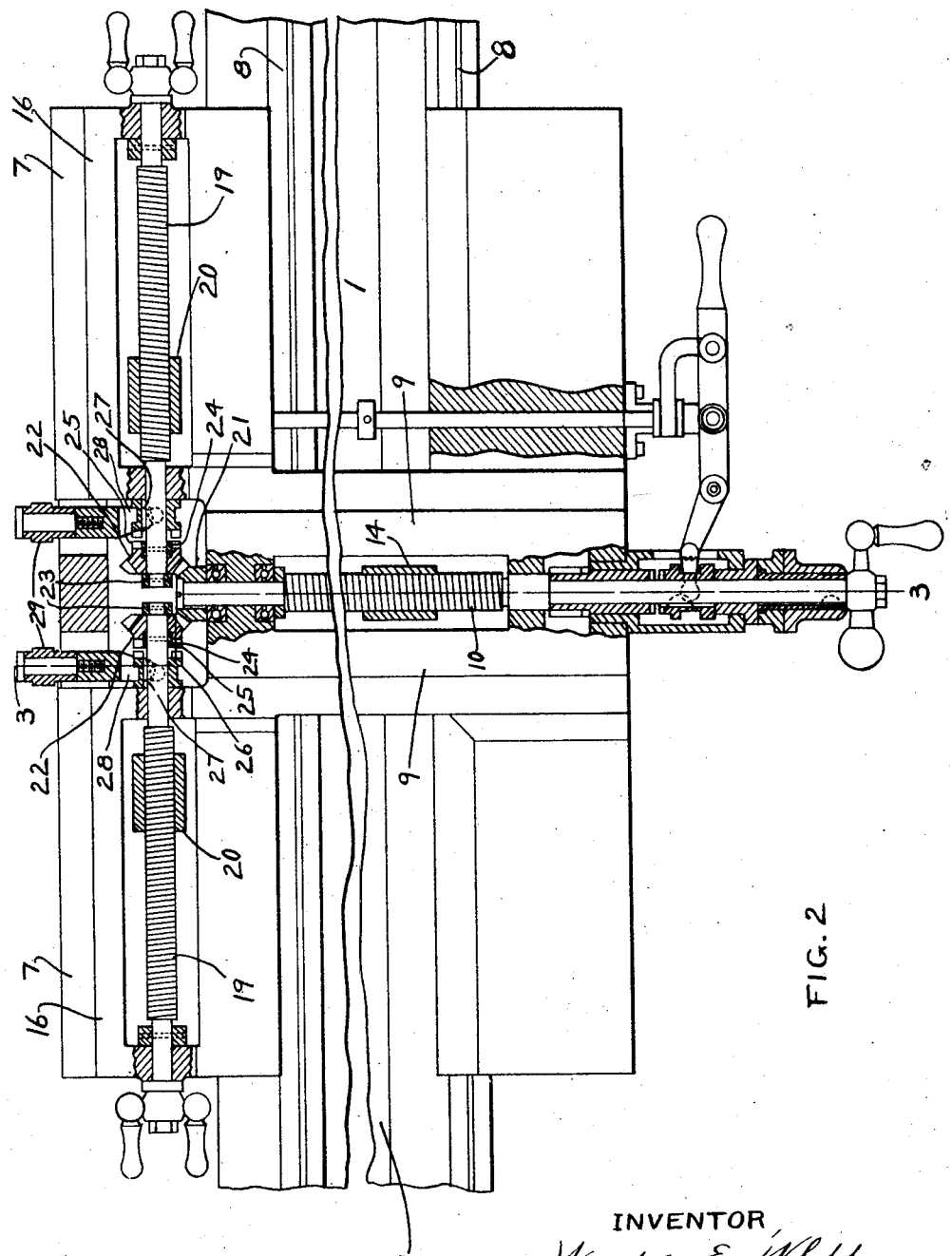

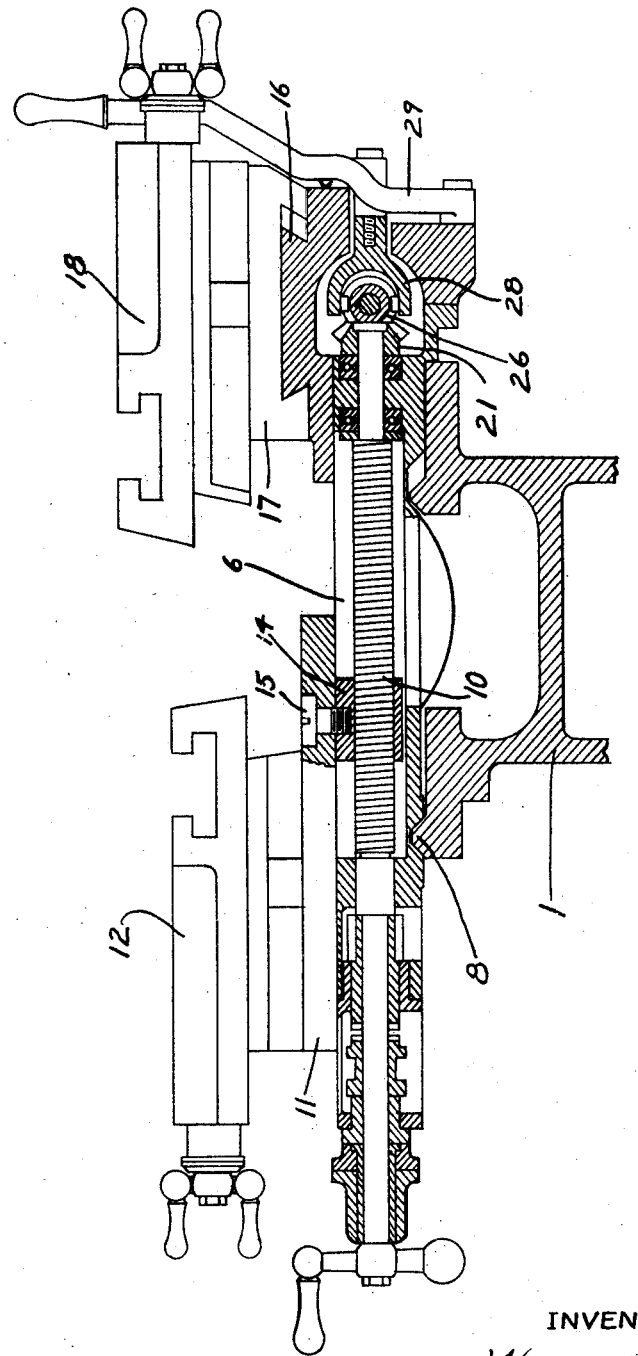

Patented July 19, 1927.

1,636,028

UNITED STATES PATENT OFFICE.

WENDELL E. WHIPP, OF SIDNEY, OHIO, ASSIGNOR TO THE MONARCH MACHINE TOOL COMPANY, OF SIDNEY, OHIO, A CORPORATION OF OHIO.

LATHE.

Application filed January 21, 1926. Serial No. 82,675.

This invention relates to new and useful improvements in lathes, and more particularly to improvements in engine lathes by which they may be used for both turning and facing operations at the same time.

It is one of the principal objects of my invention to mount on the rear carriage wings of a lathe, one or more tool rests which are free to be moved in either direction at right angles to the cross feed screw for turning operations upon work which at the same time is being faced by tools carried by the front tool rest.

It is another object of my invention to provide means such as bevel or worm gears to transmit power from the cross feed screw to one or more auxiliary feed screws mounted in the back carriage wings, for the purpose of moving one or more tool rests on the latter in either direction at right angles to the line of movement of the front tool rest.

Still another object of my invention is to provide nut or other suitable means for connecting the tool rests to their respective screws for the purpose of effecting their longitudinal movement along the screws when the latter are turned.

Other important and incidental objects will be brought out in the following specification and particularly set forth in the subjoined claims.

In the accompanying drawings illustrating my invention, Figure 1 is a plan view of my improved engine lathe with two rear tool rests in the back carriage wings and carrying tools for turning diameters. Figure 2 is a longitudinal, sectional view taken through the lathe showing the cross feed and auxiliary feed screws and their geared connections. And Figure 3 is a vertical, sectional view taken through the lathe on the line 3—3 of Figure 2.

Referring to the accompanying drawings for a detailed description of my invention, the numeral 1 designates a lathe bed having a headstock 2 and a tail stock 3. Rotatably supported between the latter and a chuck 4 is a piece of work 5 upon which turning and facing operations are to be performed by means hereinafter to be described.

The numeral 6 designates the lathe carriage which is formed with rear wings 7, 7 and is longitudinally movable over ways 8, 8 in the lathe bed 1. Free to be moved transversely over ways 9, 9 in the carriage 6 by a cross feed screw 10 is a cross slide 11 carrying a slidable tool rest 12. In order that this tool rest may be moved transversely of the lathe bed to engage its tools 13 with the work 5 to face the latter, there is mounted on the cross feed screw 10 a movable member such as a nut 14 which is secured to the cross slide 11 by a screw 15. Accordingly, when the cross feed screw 10 is turned by the conventional apron-operated mechanism (not shown), or by other suitable means, the nut 14 will be moved by the threads on the screw to bring the tools 13 carried by the tool rest 12 into engagement with the work to perform the desired facing operations thereon.

For the purpose of performing turning operations upon the work 5 at the time it is being faced by the tools 13, the following means are provided. Free to be moved in either direction along a dove-tail guide 16 on each back carriage wing 7, is a slide 17 carrying a back tool rest 18. While I have shown one rear tool rest 18 on each back carriage wing, a greater number may be provided for a movement in either direction thereon if desired.

To effect a movement of the rear tool rests 18, 18 in either direction, I have provided auxiliary feed screws 19, 19, each one of which is journaled in suitable bearings in a back carriage wing 7. The slides 17, 17 carrying the rear tool rests 18, 18 respectively, are connected by nuts 20 or other suitable members to the auxiliary feed screws 19, 19 for movement along the latter when they are turned by the cross feed screw 10 through means now to be described.

Fast on the inner end of the cross feed screw 10 is a bevel gear 21 which meshes with bevel gears 22, 22 loosely mounted on the reduced inner ends of the auxiliary feed screws 19, 19. Each bevel gear 22 is free to turn on the reduced end of its respective auxiliary feed screw 19 between collars 23 and 24 thereon. (See Figure 2.)

Formed on the rear portion of each bevel gear 22 are teeth 25 which are adapted to be engaged by the teeth on a clutch member 26 movably secured on its respective auxiliary feed screw 19 by a Woodruff key 27. The periphery of each clutch member 26 is grooved to receive a clutch yoke 28 that is pivotally secured to a lever 29 secured to its respective back carriage wing 7. By means of this lever the clutch member 26, which is free to turn in the yoke 28, may be moved into engagement with its respective bevel gear 22 to effect a rotation of the auxiliary feed screw 19 upon which both are mounted. By means of the jaw clutch just described, the rear tool rests 18 may be disconnected from the cross feed screw 10 to permit them to be properly positioned by hand.

One auxiliary feed screw 19 is formed with a right hand thread, and the other auxiliary screw is formed with a left hand thread, so that when the cross feed screw 10 is rotated to move the tool rest 12 toward the work 5, the rear tool rests 18, 18 will be moved toward it by the nuts 20 on the auxiliary feed screws to bring their tools 30 into engagement with the work for the execution of turning operations thereon simultaneously with the facing operations performed upon it by the tools 13. By reversing the direction of rotation of the cross feed screw 10 to withdraw the tools 13 from the work, the auxiliary feed screws 19, 19 will be turned in a reverse direction by the engagement of their bevel gears 22, 22 with the bevel gear 21 on the cross feed screw to retire the turning tools 30 from the work.

While I have shown a bevel gear connection between the cross feed screw 10 and the auxiliary feed screws 19, 19, any other suitable means may be employed to effect the rotation of the latter by the cross feed to move the rear tool rests 18, 18 in either direction along the back carriage wings 7, 7 at the same time the tool rest 12 is moved at right angles to them. It is thus seen that I have provided a simple and economic attachment for lathes of the ordinary type whereby tools may be automatically moved toward the work from different directions by the cross feed screw to perform facing and turning operations simultaneously upon it.

Having described my invention, I claim:

1. In a lathe, a carriage, rear wings on said carriage, a cross feed screw on the latter, a front tool rest on said carriage for movement in either direction by the cross feed screw, an auxiliary feed screw having a right thread on one rear wing of the carriage, and an auxiliary feed screw having a left thread on the other wing of said carriage, a rear tool rest connected to each auxiliary feed screw for movement thereby along its rear carriage wing, and a power transmitting connection between the cross feed screw and the auxiliary feed screws to turn the latter move the rear tool rests toward the work when the cross feed screw is turned to move the front tool rest toward said work.

2. In a lathe, a carriage, rear wings on said carriage, a cross feed screw on said carriage, auxiliary feed screws on said wings, tool rests adapted to be moved in either direction on said wings by the auxiliary feed screws, a power transmitting member fast on said cross feed screw, power transmitting members loosely mounted on the auxiliary feed screws in engagement with the first power transmitting member, and a clutch connection between each auxiliary feed screw and its respective power transmitting member, whereby the latter may turn said auxiliary feed screw to move its respective tool rest along the carriage wing when the cross feed screw is rotated.

3. In a lathe, a carriage, rear wings on said carriage, a cross feed screw on the latter, a front tool rest on said carriage for movement in either direction by the cross feed screw, an auxiliary feed screw having a right thread on one rear wing of the carriage, and an auxiliary feed screw having a left thread on the other wing of the carriage, a rear tool rest connected to each auxiliary feed screw for movement thereby along its rear carriage wing, and a gear connection between the cross feed screw and the auxiliary feed screws, whereby when the cross feed screw is turned to move the front tool rest toward the work, the rear tool rests will be moved toward the latter by the auxiliary feed screws, for the purpose specified.

4. In a lathe, a carriage, rear wings on said carriage, a cross feed screw on said carriage, auxiliary feed screws on said wings, tool rests adapted to be moved in either direction on said wings by the auxiliary feed screws a bevel gear fast on said cross feed screw, bevel gears loosely mounted on the auxiliary feed screws in mesh with the first bevel gear, and a clutch connection between each auxiliary feed screw and its respective bevel gear, whereby the latter may turn said auxiliary feed screw to move its respective tool rest along the carriage wing when the cross feed screw is rotated.

In witness whereof I have hereunto set my hand this 18 day of January, 1926.

WENDELL E. WHIPP.